Nov. 10, 1959  J. C. WINSLOW ET AL  2,911,860
COLLET FOOT FOR POWER TOOL
Filed Jan. 28, 1958  2 Sheets-Sheet 1
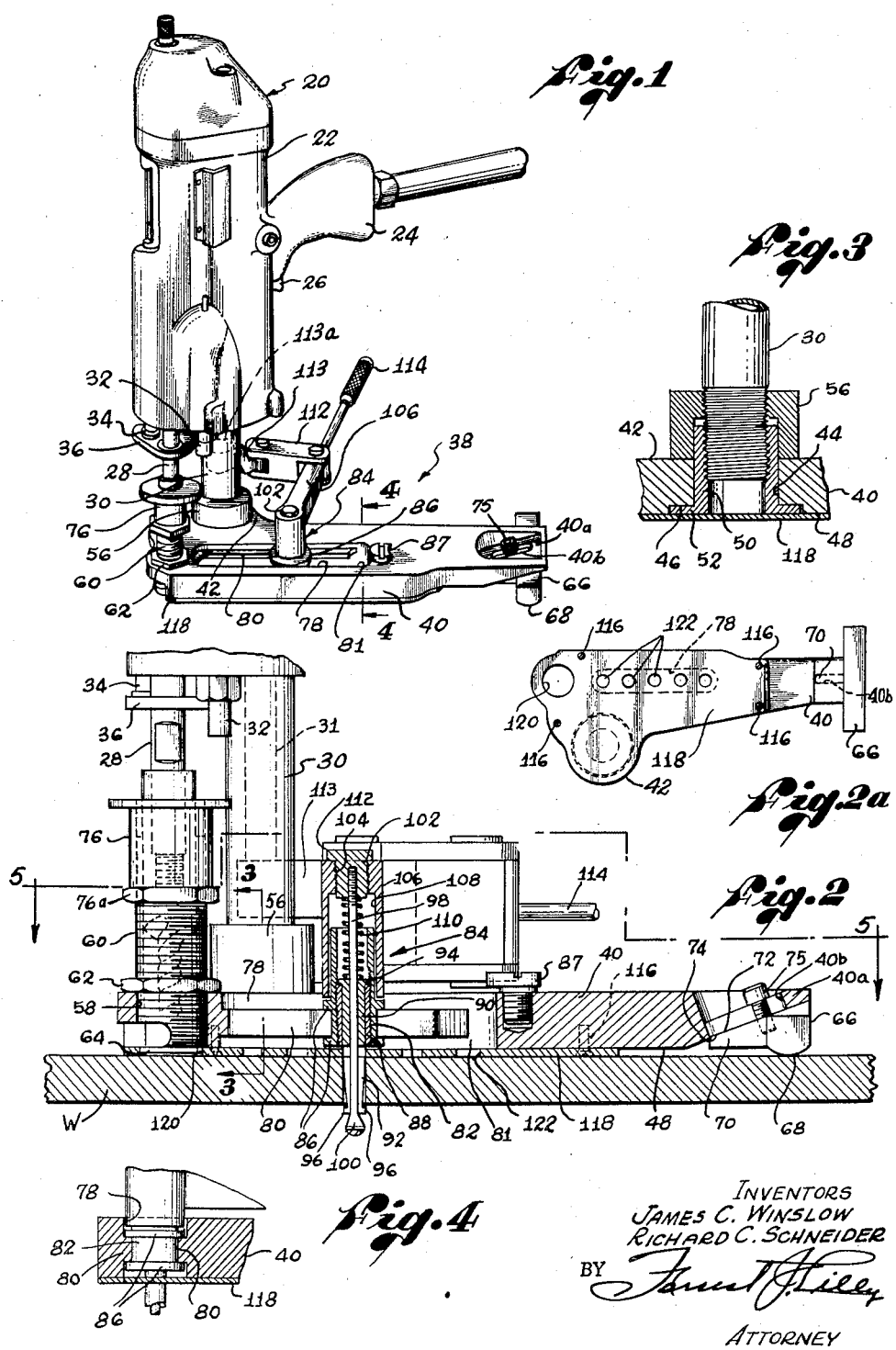
INVENTORS
JAMES C. WINSLOW
RICHARD C. SCHNEIDER
BY
ATTORNEY

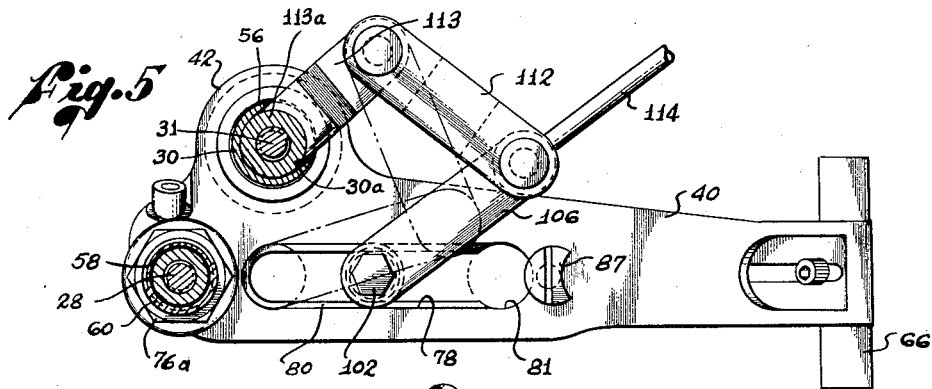
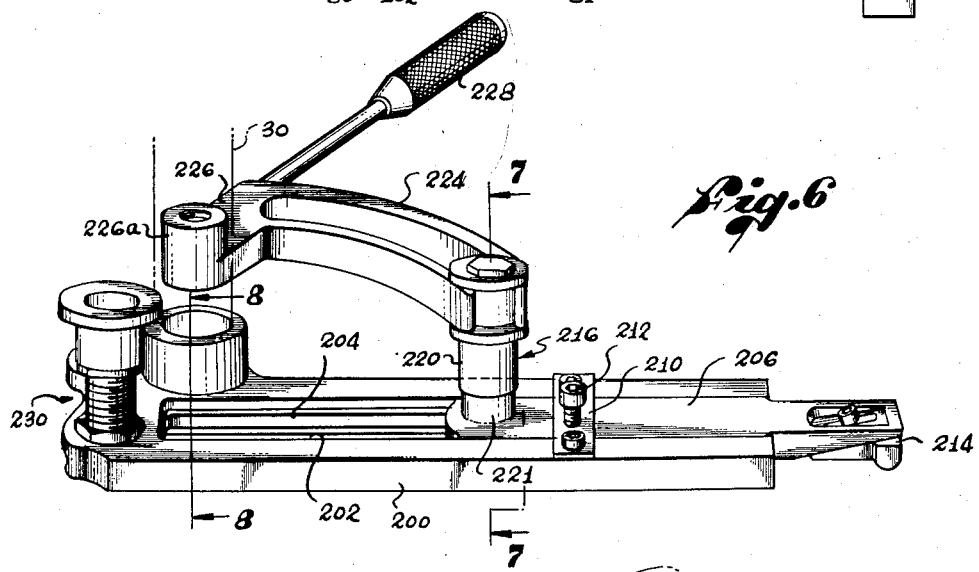
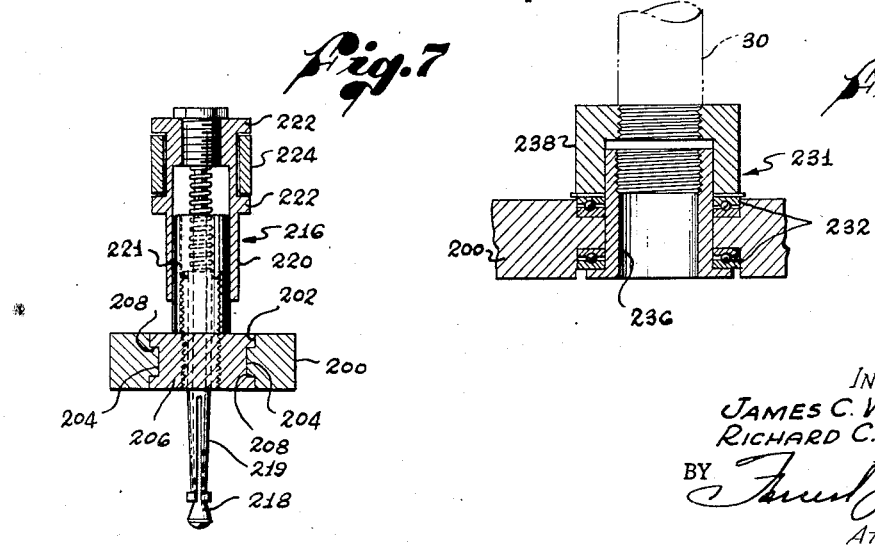

even though the latter is
United States Patent Office 2,911,860
Patented Nov. 10, 1959

2,911,860

COLLET FOOT FOR POWER TOOL

James C. Winslow, Sierra Madre, and Richard C. Schneider, Pasadena, Calif., assignors to Winslow Product Engineering Corporation, Los Angeles, Calif., a corporation of California Application January 28, 1958, Serial No. 711,755

12 Claims. (Cl. 77—55)

This invention relates to an improved hole spacing means for one of the power drills enclosed in copending application Serial No. 732,635, filed May 2, 1958, and entitled Power Drill With Work Holding Device and Spacing Means.

The prior power drill with which this invention is concerned is especially designed for drilling and countersinking a series of equally spaced holes. Briefly, this tool is equipped with a tool body extending forwardly of which are an axially extensible and retractable ram and a rotary tool spindle parallel to the ram.

The forward end of the ram carries a hole spacing device by which a drill-countersink bit on the tool spindle may be accurately located to drill a hole an exact distance from a previously drilled hole in a workpiece.

This spacing device includes a pilot element parallel to and mounted on one end of a radial arm fixed to the forward end of the ram for engaging in the previously drilled hole to accurately locate the drill bit relative to the hole. The pilot element ilustratively comprises an expansive collet which is operated by a collet operating rod or drawbar axially movable in the ram. Adjustment of the perpendicular spacing between the pilot element and drill bit to vary the spacing between drilled holes is accomplished by rotating the ram on its axis to swing the pilot element toward or away from the drill bit.

A fixed, adjusted spacing is maintained between the bit and pilot element by a work engaging spacer foot which extends between the spindle and pilot element and has a guide bushing slidably receiving the spindle and one or more bores parallel to the spindle axis for selectively receiving the pilot element.

In use of the tool, the pilot element, or collet, is inserted in a previously drilled hole in a workpiece, after which a trigger on the tool is depressed to initiate an automatic drilling cycle. During this drilling cycle, the collet is first expanded by rearward retraction of the drawbar in the ram to clamp the spacing device to the workpiece. The ram, spacing device and workpiece, clamped thereto, are then relatively retracted toward the tool body from their normal forward extended position to cause penetration of the drill bit into the work.

Mounted on the tool body, close to the spindle so as to be engaged by the rear end face of the spindle bushing during retraction of the ram and spacing device toward the body, are a depth control plunger and a feed rate control plunger. These plungres are sequentially depressed by the bushing during its rearward retractile movement with the ram to first reduce the rate of retraction of the ram at the start of countersinking and then terminate rearward retractile movement of the parts and cause their return to their normal forward extended positions at a predetermined countersink depth.

When the prior spacing device is adjusted to change the spacing between the pilot element and drill bit, the angular position of the spindle bushing, about the spindle axis, relative to the depth and feed rate control plungers on the tool body is changed. The plungers, therefore, engage different points on the end face of the bushing in different positions of adjustment of the spacing device.

It will be obvious that unless the prior spacing device is machined with extreme accuracy such that the plunger engaging end face of the spindle bushing is exactly flat and parallel to the work engaging face of the spaced foot, so that the axial spacings between the several points on the bushing end face engaged by the plungers in the different positions of adjustment of the spacing device and the work engaging face of the spacer foot are exactly the same, the depth of feed of the tool will be different in the different positions of adjustment of the spacing device. Such variations in depth of feed, while slight, are intolerable in precision drill-countersink operations.

These variations, of course, are due to the fact that the depth of feed is dependent on the extent of axial projection of the drill bit beyond the work engaging face of the spacer foot at the end of the feed stroke of the drill, that is, at the instant of termination of retraction of the ram, which axial projection, in turn, is dependent on the axial spacing between the working engaging face of the spacer foot and the particular points on the bushing end face engaged by the control plungers. Since, as mentioned, this axial spacing will vary in the different positions of adjustment of the prior spacing device, unless the latter is made with extreme precision and accuracy, so will the depth of feed.

Such precise and accurate machining operations, of course, are time consuming, costly and even under ideal conditions, difficult to accomplish.

This deficiency of the prior spacing device is avoided in the present invention by virtue of the fact that the angular position of the spindle bushing of the present hole spacing device about the spindle axis and relative to the depth and feed rate control plungers on the tool remains unchanged during adjustment of the device to vary the spacing between the spindle and pilot element. The plungers therefore always engage the same points on the plunger engaging end face of the bushing regardless of the position of adjustment of the device. Clearly, under these conditions, the axial projection of the tool bit beyond the work engaging face of the spacing device and, therefore, the depth of feed of the tool, remain unchanged during adjustment of the device not machined with extreme accuracy and precision.

A broad object of this invention is the provision of an improved hole spacing device for use on a tool of the character described which avoids the above-noted deficiencies of the existing hole spacing device.

A more specific object of the invention is the provision of an improved hole spacing device for a tool of the character described which is constructed so that accurate depth control in tool operation is not affected by adjustment of the spacing between the pilot element and tool spindle.

Another object of the invention is the provision of an improved hole spacing device of the character described which permits adjustment of the spacing between the tool spindle and pilot element without altering the relative positions of the spacer foot and tool body.

A further object of the invention is the provision of an improved hole spacing device of the character described which is uniquely adapted to use with or without an overlay template.

Other objects, advantages and features of the invention will become readily apparent as the description proceeds.

Briefly, the foregoing and other objects of the invention are achieved by the provision of a hole spacing device equipped with a rigid bar or spacer foot mounting at one end a bushing for receiving the spindle of the prior tool. One end of this bushing is engageable with the depth control and feed rate control plungers as before. This end of the bar also mounts a coupling for attaching the bar to the ram of the tool.

The pilot element of the present spacing device, which element illustratively comprises an expansive collet, is slideably supported on the bar for movement along the latter to vary the spacing between the collet and spindle bushing. The collet may be fixed in any adjusted position along the bar.

Operatively connected to the expanding mandrel of the collet is a link mounting a handle by which the collet may be moved along the bar. One end of this link has a coupling for connection to the collet operating rod or drawbar in the ram of the prior tool.

During adjustment of the collet along the bar, the angular position of the latter and its spindle bushing, about the spindle axis, relative to the control plungers on the tool remains unchanged. Accurate depth control, without the need of costly and time consuming machining operations, is thereby achieved for the reasons preliminarily discussed.

A better understanding of the invention may be had from the following detailed description thereof taken in connection with the annexed drawings, wherein:

Fig. 1 is a perspective view showing one form of the hole spacing device mounted on the prior tool;

Fig. 2 is an enlarged section through the device of Fig. 1;

Fig. 2a is a view, on reduced scale, of the underside of the present spacing device;

Fig. 3 is a section taken along line 3—3 of Fig. 2;

Fig. 4 is an enlarged section taken along line 4—4 of Fig. 1;

Fig. 5 is a section taken along line 5—5 of Fig. 2;

Fig. 6 is a perspective view of a modified form of the present spacing device;

Fig. 7 is a section taken along line 7—7 of Fig. 6; and

Fig. 8 is an enlarged section taken along line 8—8 of Fig. 6.

Referring first to Figs. 1–5 of these drawings, the numeral 20 denotes the power tool of the aforementioned co-pending application, Serial No. 732,635. As described more fully in that application, tool 20 comprises a tool body 22 having a pistol grip handle 24. Mounted on this handle is a trigger 26 for initiating operation of the tool.

Extending in parallel fashion forwardly of the tool body are a rotary tool spindle 28 and a ram sleeve 30. Ram sleeve 30 is mounted in the tool body for axial extension and retraction realtive to the latter. In the normal inoperative condition of the tool, the ram sleeve occupies a forward extended position shown in Figs. 1 and 2.

Mounted for limited axial sliding movement in the sleeve 30 is a collet operating rod or drawbar 31 (Fig. 5) which is accessible through a slot 30a in the wall of the ram sleeve. The forward end of the ram sleeve is threaded. As described in the prior application, actuation of trigger 26 results in initial rearward retraction of the drawbar 31 in the ram sleeve and subsequent rearward retraction of the latter as well as rotation of the spindle 28.

Indicated at 32 and 34 are a feed rate control plunger and depth control plunger, respectively, embodied in the prior tool. A plate 36, slideably journalling the tool spindle 28, is fixed to the depth control plunger 34.

Depression of the feed rate control plunger 32 operates to vary the speed of retraction of the ram during operation of the tool while depression of the depth control plunger 34 operates to terminate retraction of the ram and cause automatic return of the latter to its extended position of Fig. 1, in the manner discussed in the prior application, Serial No. 732,635.

The spacing device 38 of this invention comprises a rigid metal bar 40 which is configured, as shown, to provide adjacent one end thereof a generally semi-circular, lateral projection 42. Extending through this projection is a bore 44 (Fig. 3). Bore 44 is counter-bored at its lower end to form an annular recess 46 in the lower face 48 of the bar.

Rotatably received in the bore 44 is an internally threaded sleeve 50. Sleeve 50 has a lower external flange 52 seating in the recess 46. Sleeve 50 is provided with lug receiving recesses (not shown) or other suitable means by which the sleeve may be turned.

When mounting the spacing device 38 on the tool 20, the sleeve 50 is threaded on the lower threaded end of the ram sleeve 30, as shown, by inserting the threaded end of the ram into the sleeve 50 and then rotating the latter in its bore 44 to threadedly couple the ram sleeve and sleeve 50. A lock sleeve or nut 56, also threaded on the ram sleeve, is then screwed tightly against the upper face of the bar 40 to firmly secure the latter to the ram sleeve.

Extending through the adjacent end of the bar 40 parallel to the bore 44 is a threaded bore 58 (Fig. 2). Bore 58 is offset laterally and longitudinally of the bar relative to the bore 44, as illustrated, and has threaded therein the lower end of an externally threaded spindle bushing 60. A lock nut 62 threaded on the bushing restrains the latter against turning with respect to the bar 40. The bushing has a reduced cylindrical lower end or lip 64 which projects slightly below the lower face 48 of the bar 40 for reasons to be seen. Bar 40, at its end remote from the bushing 60, has its upper face recessed and its lower face bevelled to form a relatively thin, inclined web 40a. Located below the latter end of the bar 40 is a work-engaging pad 66 formed with a lower, rounded work-engaging face 68, and a generally wedge-shaped center section 70, the upper inclined surface 72 of which bears against the inclined undersurface 74 of the web 40a. Pad 66 is slideable along the inclined bar surface 74 to locate its work engaging face 68 substantially flush with or below the face 48 of the bar 40. Pad 66 is releasably secured in adjusted position by a lock bolt 75 which extends through a slot 40b in the web 40a and is threaded in the pad.

Threaded on the upper end of the bushing 60 is a shouldered sleeve 76. As will presently be described, the upper end face of this sleeve is engageable with the feed rate plunger 32 and plate 36 to depress the plungers 32 and 34 during operation of the tool 20.

Bar 40 is formed with a longitudinally extending slot 78 having semi-circular ends, as shown. The wall of this slot is recessed to form a rib 80, the upper and lower faces of which are spaced inwardly of the upper and lower surfaces of the bar 40. This rib extends around the semi-circular, left-hand end of the slot 78, as illustrated, but terminates short of the right-hand end of the slot, as viewed in Fig. 1, and has arcuate end surfaces so as to provide at the latter end of the slot a generally circular opening 81 through the bar.

Slideably received in the slot 78 is a sleeve 82 which comprises a part of the pilot element or expansive collet 84 of the present collet foot. Sleeve 82 has a pair of axially spaced, annular shoulders 86 which straddle the rib 80 so that the sleeve 82 is restrained against axial movement out of the slot 78.

Assembly of the sleeve 82 in the slot is accomplished by inserting the sleeve into the right-hand circular end 81 of the slot and then sliding the sleeve to the left in the slot. A rotatable shoulder screw 87 is threaded in the bar 40 in a position with its head partially overlying the opening 81 for releasably preventing upward axial movement of the sleeve 82 when the latter is at the right-hand end of the slot 78. The screw head is cut away on one side so that it may be turned into a position to permit insertion or removal of sleeve 82.

Threaded in the sleeve 82 is a bushing 88 in which is slideably received a collet sleeve 90. The lower end of this latter sleeve forms an expandible pilot portion which projects beyond the face 48 of bar 40 and is longitudinally slotted to provide a plurality of flexible collet fingers 92. Formed on the upper end of the collet sleeve 90 is an external circular shoulder 94. The lower ends of the collet fingers 92 also have external shoulders 96 which form a generally circular shoulder on the lower end of the collet sleeve.

Extending slideably through the collet sleeve 90 is a collet expanding mandrel 98. Mandrel 98 has an enlarged conical head 100 at its lower end. The upper end of the mandrel is threaded in a plug 102 which, in turn, is threaded in a bore 104 extending into the upper face of the hub of a link 106. Bore 104 continues at its lower end in an enlarged, smooth bore 108 which opens through the lower face of the hub of link 106 and slideably and rotatably receives the upper end of the sleeve 82.

Acting between the plug 102 and the collet sleeve 90 is a compression spring 110. This spring normally urges the collet sleeve to the lower limiting position shown wherein the upper collet sleeve shoulder 94 abuts the upper end of the collet sleeve bushing 88.

The free end of link 106 is pivoted to one end of a second link 112, the other end of which is pivoted to a rod coupling 113. This coupling has an end 113a which is cylindrically shaped the same as the collet operating arm (not shown) in the prior tool for attachment to the collet operating rod or drawbar 31 (Fig. 5) in the ram sleeve 30.

In operation of the tool 20 with the present spacing device 38 mounted thereon, the lower end of the collet sleeve 90 is inserted in a predrilled hole in a workpiece, as shown in Fig. 2. When the trigger 26 is depressed, the collet operating rod or drawbar 31 to which the coupling 113 is secured is initially retracted in the ram sleeve 30. The coupling 113 and the links 106 and 112 are retracted with the collet operating rod. This retraction of the linkage pulls the collet mandrel 98 rearwardly in the collet sleeve 90, the latter initially remaining stationary under the action of the spring 110. The collet fingers 92 are thereby flexed outwardly by the conical head 100 on the mandrel.

Upon outward flexing of the fingers being terminated by contact of the latter with the wall of the predrilled hole in the workpiece, the collet sleeve 90 is drawn rearwardly with the mandrel until the collet finger shoulders 96 contact the underside of the workpiece. Further retraction of the collet sleeve is then prevented and the rearward pull exerted on the mandrel acts to force the collet fingers tightly against the workpiece. The ram sleeve 30 and spacing device 38 are then retracted as a unit toward the tool body 22 with resultant relative advancing of the tool bit on the spindle 28 toward the workpiece.

During this retraction of the spacing device, the upper face of the adjustable sleeve 76 on the bushing 60 engages the feed rate control plunger 32 and depresses the latter to vary the feed rate in the manner and for the reasons described in application, Serial No. 732,635. Continued retraction of the ram brings the sleeve 76 into contact with the plate 36 fixed to the depth control plunger 34 with resultant depression of the latter to effect automatic termination of retraction of the ram and return of the latter to its normal extended position of Fig. 1. Sleeve 76 may be adjusted on the bushing 60 to vary the depth of feed. A lock nut 76a is provided for retaining the sleeve 76 in adjusted position, as shown.

The collet 84 is movable along the slot 78 to vary the spacing between the axes of the collet and spindle and thereby vary the spacing between holes drilled in the workpiece. To facilitate this adjustment of the collet, there is fixed to the link 106 a handle 114 by which the collet may be moved along the slot.

It will be observed that this adjustment of the collet does not alter the angular position, about the spindle axis, of the bar 40, and more particularly its bushing 60 relative to the control plungers 32, 34 which is advantageous for the reasons preliminarily set forth. Accurate depth control is, therefore, achieved for the reasons preliminarily set forth.

In order to retain a fixed spacing between the bushing 60 and collet 84, there is removably secured to the forward face 48 of the bar 40, by screws 116, a spacer plate 118. This plate has an opening 120 for slideably receiving the extending cylindrical end 64 of the bushing 60 and a series of spaced openings 122 for slideably receiving the collet sleeve 90, as shown.

The collet sleeve is adapted to be selectively positioned in any one of the holes 122 to establish different predetermined spacings between the collet and spindle bushing. Also, the spacer plate is removable for replacement by another spacer plate which establishes different collet-spindle spacings. It will be observed that the thickness of the spacer plate is slightly greater than the axial projection of the cylindrical bushing end 64 beyond the lower face 48 of the bar 40, so that the spacer plate may bear flatly against a workpiece.

The spacing device may also be used with an overlay template, not shown, by removing the spacer plate 118. In this case, the end 64 of the spindle bushing and the collet sleeve 90 are inserted in holes in the template, the latter retaining a fixed collet-spindle spacing. The pad 66 is adjusted to place its work engaging face 68 flush with the face 48 of bar 40.

Figs. 6–8 illustrate a modified form of the present spacing device. This modified device comprises a bar 200 which is similar in shape to the bar 40 of Figs. 1–5. The slot 202 in the bar 200 is somewhat wider than the slot in the bar 40, however, and opens through one end of the bar 200, as shown. A rib 204 extends about the wall of the slot 202.

Slideable in the slot 202 is a plate 206 having grooves 208 in its side edges for slideably receiving the rib 204. Extending across the slot 202 and secured at its end to bar 200 is a bridge 210 mounting a set screw 212 engageable with plate 206 for clamping the latter in adjusted position. The right-hand end of the plate 206 mounts an adjustable work-engaging pad 214 identical to the work engaging pad 66 of Figs. 1–5.

The left-hand end of the plate 206 carries a collet 216 which is substantially identical to the collet 84 of Figs. 1–5. Collet 216 differs from collet 84 in that the mandrel 218 for expanding the split collet sleeve 219 of the collet is fixed to a sleeve 220 rather than a link, as in collet 84. Sleeve 221 of the collet 216, corresponding to sleeve 82 of the collet 84, is rigid on plate 206 and slideably receives the sleeve 220. The upper end of the sleeve 220 is formed with a pair of axially spaced, annular shoulders 222.

Slideably straddling the sleeve 220, between the shoulders 222, is one end of a circularly curved fork 224. The other end of the fork 224 has a lateral arm 226 terminating in a rod coupling 226a, identical to the rod coupling 113a in Fig. 1, and which is adapted to be removably fixed to the collet operating rod within the mandrel sleeve 30 of the tool 20 (not shown in Figs. 6–8). Fork 224 mounts a handle 228.

The left-hand end of the bar 200 mounts a spindle bushing and adjustable sleeve assembly 230, identical to the bushing 60 and sleeve 76 of Figs. 1–5. Also, as shown in Fig. 8, the bar 200 has a ram coupling 231 which is somewhat similar to the ram coupling 50, 56 of Figs. 1–5. In the device of Figs. 6–8, however, a pair of bearings 232 journal the threaded coupling sleeves 236 and 238, which are substantially identical to the coupling sleeves 50 and 56 of Figs. 1–5. The ram sleeve 30 may, therefore, turn with respect to the bar 200.

In use, the fork 224 and the ram sleeve 30 are turned by the handle 228 to adjust the position of the collet 216 along the bar 200. During this adjustment, of course, the sleeve 220 of the collet slides along the curved slot in the fork. After the collet has been suitably positioned, it is locked in position by the set screw 212.

During operation of the tool 20, the fork 224 is initially retracted with the collet operating rod in the ram sleeve 30. This retraction of the fork pulls the mandrel 218 rearwardly to expand and then retract the split collet sleeve 219, as before. The spacing device and ram sleeve are then retracted as a unit and subsequently automatically returned to their normal extended position upon engagement of the bushing assembly 230 with the depth control plunger 34 (not shown in Figs. 6–8) of the power tool.

It will be observed that as in the spacing device of Figs. 1–5, the bar 200 and its bushing 230 in Figs. 6–8 are not angularly shifted relative to the tool body during adjustment of the spacing between the collet 216 and tool spindle. Accurate depth control is thereby maintained as before.

While certain preferred embodiments of the invention have been disclosed for illustrative purposes, it will be apparent that numerous modifications in design and arrangement of parts are possible within the scope of the following claims.

We claim:

1. For use on a power tool of the character described including a tool body having a forwardly extending relatively extensible and retractable spindle, ram and collet operating rod, a hole spacing device comprising: an elongate, rigid bar having a forward face, a spindle guide bushing fixedly mounted on said bar with its axis extending transversely of said face, coupling means attached to said bar for securing the latter to the ram of the tool, an expansive collet slidably mounted on said bar for movement along the latter toward and away from said bushing with the axis of the collet substantially paralleling said bushing axis, said collet having an expandable pilot portion extending forwardly of said face for engaging in a hole in a workpiece and including an axially movable mandrel element for effecting expansion and contraction of said pilot portion, a coupling member laterally offset from the collet for attachment to the collet operating rod of the tool, and an axially rigid, laterally articulated connection between said mandrel element and coupling member for transmitting a force exerted on said member in a direction paralleling the collet axis to said mandrel element to axially move the latter in the collect while accommodating movement of said collet as a whole relative to said coupling member and along said bar.

2. The subject matter of claim 1 including means for releasably securing said collet in adjusted position along said bar.

3. The subject matter of claim 1 wherein said coupling means comprises a threaded sleeve coupling on said bar arranged with its axis substantially parallel to and spaced a predetermined distance from the axis of said bushing.

4. The subject matter of claim 1 wherein said connection includes a link hingeably connected to the collet for pivoting of the link on the collet about the axis of the latter, said link being swingable in a plane normal to the axis of the collet to shift the latter along said bar, and a handle extending from said link for swinging the latter in said plane.

5. For use on a power tool of the character described including a tool body having a forwardly extending, relatively extensible and retractable spindle, ram and collet operating rod, a spacing device comprising: an elongate, rigid bar having a forward face, a spindle guide bushing fixedly mounted on said bar with its axis extending transversely of said face, coupling means attached to said bar for securing the latter to the ram of the tool, a collet mounted on said bar for movement along the latter toward and away from said bushing with the axis of the collet substantially paralleling the bushing axis, said collet including a sleeve slidably guided on said bar for movement along the latter and extending rearwardly of the bar and an expansive pilot portion slidable in said sleeve and extending forwardly of said face for engaging in a hole in a workpiece, means biasing said pilot portion forwardly in said sleeve, a collet expanding mandrel element axially movable in said pilot portion for effecting expansion and contraction thereof, a coupling member for attachment to the collet operating rod of the tool, an axially rigid, laterally articulated connection between said coupling member and collet expanding mandrel element for transmitting a force exerted on said member in a direction paralleling the axis of said collet to said mandrel element to axially move the latter in said pilot portion while accommodating movement of said collet relative to said coupling member and along said bar, said connection including a link hingeably connected to said sleeve for pivoting of the link on the sleeve about the axis of the latter whereby said collet may be moved along said bar by swinging of said link in a plane normal to the collet axis.

6. The subject matter of claim 1 wherein said collet comprises a rear axially movable bearing sleeve located rearwardly of said bar and connected to said mandrel element for axially moving the latter, said connection comprising an arm extending laterally of and having a slotted end which slidably and rotatably straddles said sleeve, a pair of annular shoulders on said sleeve at opposite sides of said arm for restraining the latter against axial movement along the sleeve, and said coupling member being rigid on the other end of said arm.

7. The subject matter of claim 1 wherein said collet comprises a rear bearing sleeve portion located rearwardly of said bar, said connection comprising a series of links hingeably joined in end-to-end fashion for relative pivoting of the links about axes parallel to the collet and spindle axes, one end link mounting a bearing sleeve portion slidable and rotatable on said collet bearing sleeve portion, said mandrel element being secured to said one end link, and said coupling member being pivoted to the other end link.

8. In a spacing device of the character described, an elongate rigid bar having a forward face, a spindle guide bushing fixedly mounted on said bar with its axis extending in a transverse direction of said face, a pilot member parallel to the bushing axis and slidably mounted on said bar for movement along the latter toward and away from said bushing, said pilot member having an end extending forwardly of said face for engagement in a hole in a workpiece, and a spacer plate removably fixed to said face of the bar and formed with an opening slidably receiving said extending end of the pilot member for retaining the latter in adjusted position along said bar, said plate being removable for replacement by another plate for retaining said pilot element in a different adjusted position.

9. The subject matter of claim 8 wherein said plate has at least one additional opening spaced along the bar from said first-mentioned opening for receiving said pilot element in a different adjusted position of the latter.

10. The subject matter of claim 8 wherein the forward end of said bushing extends forwardly of said face a distance substantially equal to the thickness of said plate and the latter has an opening slidably receiving said extending forward end of the bushing, said plate being removable from the bar to permit use of said spacer foot with a template having holes for receiving said extending ends of said pilot member and bushing.

11. For use on a power tool of the character described including a tool body having a forwardly extending, relatively extensible and retractable spindle, ram and collet operating rod, a spacing device comprising: an elongate, rigid bar having a forward face, a spindle guide bushing fixedly mounted on said bar with its axis extending transversely of said face, coupling means attached to said bar for securing the latter to the ram of the tool, a pilot member parallel to the bushing axis, means slidably mounting said pilot member on said bar for movement along the latter toward and away from said bushing, said pilot member having an end extending forwardly of said face for engagement in a hole in a workpiece and a rear cylindrical portion located rearwardly of said bar, a coupling member laterally offset from said pilot member for connection to said collet operating rod, a slotted arm rigid on said coupling member and rotatably and slidably straddling said cylindrical portion of the pilot member, a handle on said arm for swinging the latter to slide said pilot member along said bar, and means for releasably securing said pilot member in an adjusted position along the bar.

12. For use on a power tool of the character described including a tool body having a forwardly extending, relatively extensible and retractable spindle, ram and collet operating rod, a spacing device comprising: an elongate, rigid bar having a forward face, a spindle guide bushing fixedly mounted on said bar with its axis extending transversely of said face, coupling means attached to said bar for securing the latter to the ram of the tool, a pilot member parallel to the bushing axis, means slidably mounting said pilot member on said bar for movement along the latter toward and away from said bushing, said pilot member having an end extending forwardly of said face for engagement in a hole in a workpiece and a rear cylindrical portion located rearwardly of said bar, a coupling member laterally offset from said pilot member for connection to said collet operating rod, a series of links hingably joined in end-to-end fashion for relative pivoting of the links about axes parallel to the axes of said bushing and pilot member, one end link having a sleeve portion rotatable on said cylindrical portion of the pilot member, said coupling member being pivoted on the other end link, a handle on one of said links for hinging the links to slide said pilot member along said bar, and means for releasably securing said pilot member in adjusted position along the bar.

References Cited in the file of this patent

UNITED STATES PATENTS

| | | |
|---|---|---|
| 2,592,432 | Kline et al. | Apr. 8, 1952 |
| 2,612,793 | Timpner | Oct. 7, 1952 |
| 2,674,906 | Timpner | Apr. 13, 1954 |